UNITED STATES PATENT OFFICE.

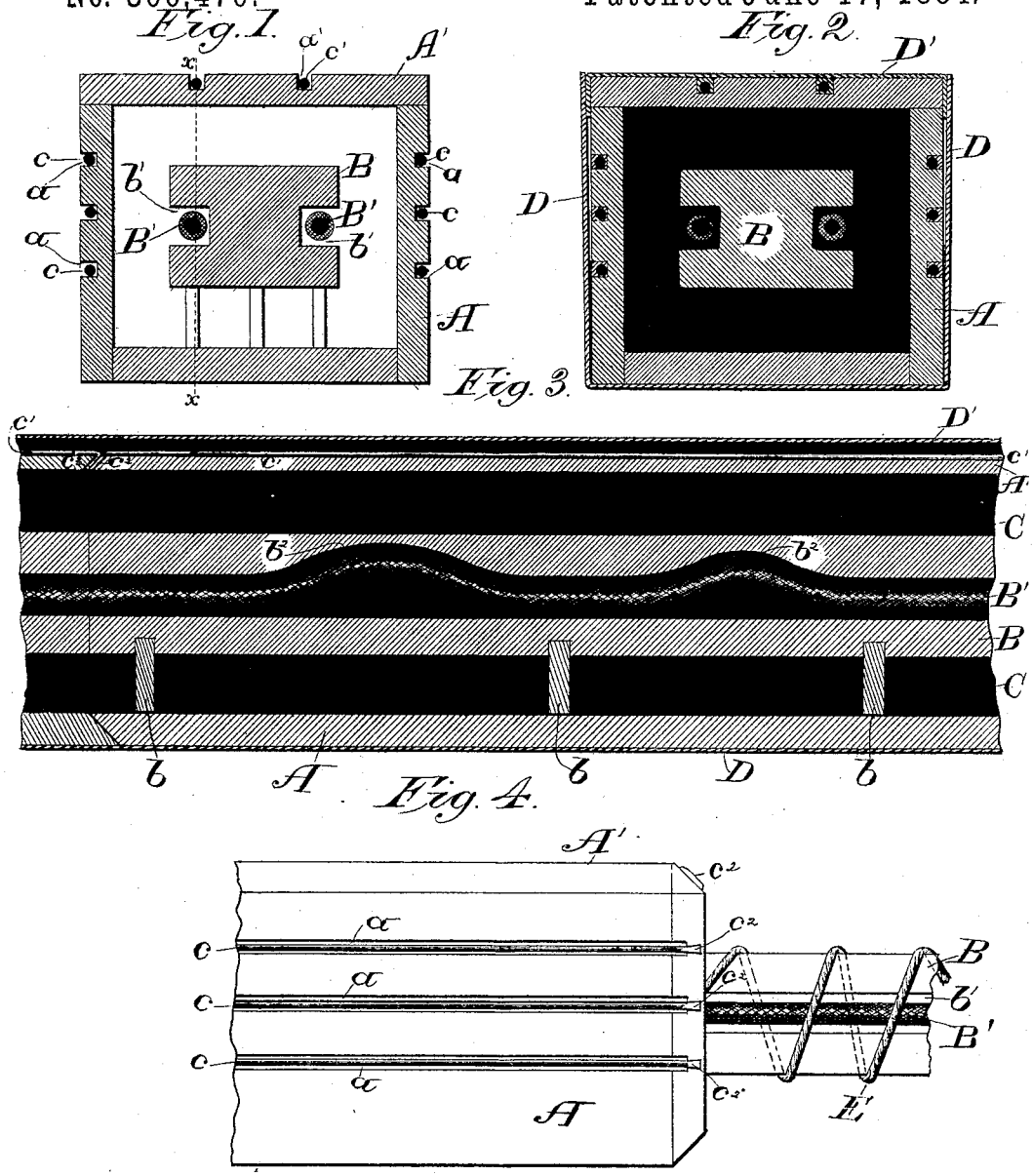

MARVIN P. HATHAWAY, OF MILWAUKEE, WISCONSIN.

CONDUIT FOR ELECTRIC WIRES.

SPECIFICATION forming part of Letters Patent No. 300,470, dated June 17, 1884.

Application filed March 3, 1884. (No model.)

*To all whom it may concern:*

Be it known that I, MARVIN P. HATHAWAY, of Milwaukee, in the county of Milwaukee, and in the State of Wisconsin, have invented certain new and useful Improvements in Conduits for Electric Wires; and I do hereby declare that the following is a full, clear, and exact description thereof.

My invention relates to conduits for electric wires, and will be fully described hereinafter.

In the drawings, Figure 1 is a cross-section of my conduit with the wires in place. Fig. 2 is also a cross-section, but after the insulating material has been added and with the outside metal covering in place. Fig. 3 is a longitudinal section of my conduit insulated and inclosed in the metal covering, and Fig. 4 an outside view of the conduit and bridge before insulation.

A is a rectangular box of wood or any other suitable non-conducting material, and B is a bridge or support provided with grooves $b'$ $b'$ on each side for the cables or large electric-light wires B' B'. Both the box and bridge are made in sections, and may be of any length required. On its outside the box is gained, as at $a$, to receive either telegraph or telephone wires $c$ $c$; or these gains may be on the inside of the box, if desired; and the ends of the sections are beveled, as shown in Fig. 4, to permit the telegraph or telephone wires of the various sections to be bent down in position to abut against the wires in line with them on the next section. The bridge B is supported in the box A by wooden or other non-conducting props, $b$, that rest on the bottom of the box, and an insulator of rosin or any other plastic insulating material is filled in about the bridge and its wires on the inside of the box, that will not only insulate but will protect the wires from moisture. This insulating material (marked C) is shown by the perfectly-black portions in Fig. 3. Next the cover A' is put upon the box, and this cover may also have gains in its upper surface, as at $a'$, to receive telephone or telegraph wires $c'$ $c'$, and the insulating material is filled in around these wires, and the wires $c$ $c$ also, and then these boxes A thus equipped are placed in square galvanized-iron troughs D, which form three sides of an outside box, (the said troughs being made also in sections,) and next the galvanized-iron cover D' is applied, which has flanges turned down to slip inside the upper side edges of the troughs D, and next to the cover and upper part of the box A, as shown in Fig. 2, after which the trough D and its cover D' are secured together by soldering, making a tight metallic case for the whole.

In order to guard against the danger of breakage of the cables B' from contraction in cold weather, I provide the upper edges above the grooves $b'$ in the bridge B with recesses $b^2$ at intervals, and then in fitting the cables in the grooves I bend the former up into the recesses, as shown in Fig. 3, so that they may have plenty of room to straighten out in, and to expand in again under the changes of temperature, as the insulating material is sufficiently elastic to yield under the pressure of the cables without offering any obstacle.

I have shown my bridges B provided with only two grooves—one on each side—but there may be any number desired, according to the size of the bridge and the number of cables to be sustained therein; and after I have put the cables in place I wrap a cord around the bridge and cables, as shown at E in Fig. 4, to keep the latter in place while the insulating material is being poured around the whole within the box A. The cables are continuous; but the single wires $c$ or $c'$ are made in sections and bent down at each end, as shown at $e^2$, on the bevel of the ends of the box or cover, and the next section is beveled in the opposite way, and the ends of these wires $c$ or $c'$ in that section bent over on that bevel, so that when two sections are put together these ends $c^2$ $c^2$ of the section of wires $c$ or $c'$ will be in contact, as shown at the left hand in Fig. 3.

Having thus described my invention, what I claim as new, and desire to secure by Letters Patent, is—

1. In a conduit for electric wires, the bridges B, having side grooves, $b'$, and recesses $b^2$ above the tops of the grooves at intervals, whereby space is provided for the expansion and contraction of the cables when in said grooves.

2. In a conduit for electric wires, the boxes A A', having beveled ends and longitudinal gains $a\ a'$, in combination with the section-wires $c\ c'$, fitted within said gains, and bent down at each end to conform to the bevel.

3. In a conduit for electric wires, the combination of the bridge B with side grooves, the cables B', fitted within said grooves, and the cord E, wrapped around the whole, substantially as set forth.

In testimony that I claim the foregoing I have hereunto set my hand, at Milwaukee, in the county of Milwaukee and State of Wisconsin, in the presence of two witnesses.

MARVIN P. HATHAWAY.

Witnesses:
S. S. STOUT,
H. G. UNDERWOOD.